June 16, 1925.                                                    1,542,357
H. F. BECHER
AUTOMOBILE TURNTABLE
Filed Nov. 6, 1924
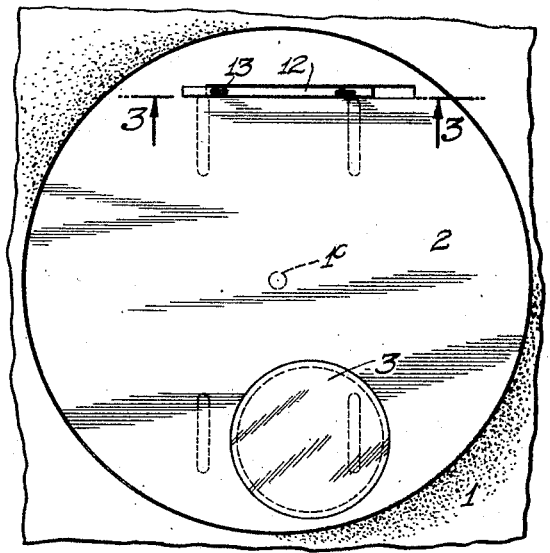
FIG. 1.
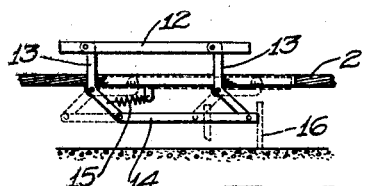
FIG. 3.
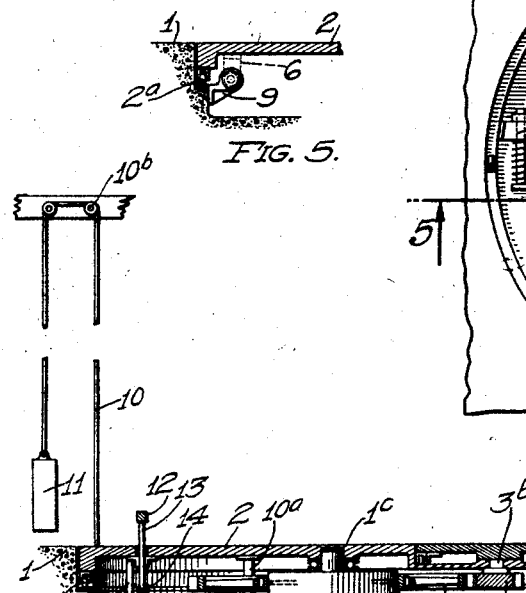
FIG. 5.
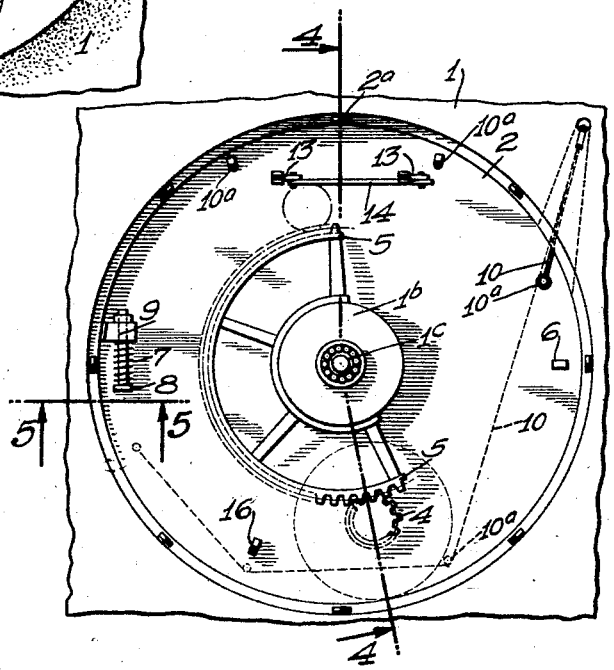
FIG. 2.
FIG. 4
Inventor
HENRY F. BECHER.
By A. B. Bowman
Attorney Patented June 16, 1925.

1,542,357

UNITED STATES PATENT OFFICE.

HENRY F. BECHER, OF ORANGE, CALIFORNIA.

AUTOMOBILE TURNTABLE.

Application filed November 6, 1924. Serial No. 748,076.

*To all whom it may concern:*

Be it known that I, HENRY F. BECHER, a citizen of the United States, residing at Orange, in the county of Orange and State of California, have invented certain new and useful Improvements in Automobile Turntables, of which the following is a specification.

My invention relates to turntables for automobiles in garages and the objects of my invention are: first, to provide a turntable floor for garages in which the automobile when driven into the garage will automatically turn itself around with the floor so that it faces in the opposite direction so that it may be driven out forwardly; second, to provide a turntable of this class which will automatically return to the position for receiving the automobile as soon as the automobile is driven off of the turntable; third, to provide a turntable of this class, in which the traction of the vehicle wheel when driven onto the turntable will automatically operate the turntable; fourth, to provide a turntable of this class with stop means by which it is stopped when it reaches a proper position so that the automobile may be driven from the garage; fifth, to provide a stop for stopping the automobile in the proper position for automatically turning the turntable, which stop means automatically disappears when the turntable is turned to the proper reverse position for driving the vehicle out forwardly; sixth, to provide a novelly constructed, automatic turntable for automobile garages; seventh, to provide an apparatus of this class which is very simple and economical of construction, durable, automatic in its action, easy to install and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a plan view of my automobile turntable, showing it mounted in a garage floor which is shown fragmentarily; Fig. 2 is a similar view showing the revoluble platform as transparent to facilitate the illustration; Fig. 3 is a side elevational view of the automobile stop means and its operating mechanism shown in connection with a fragmentary portion of the platform through 3—3 of Fig. 1 and showing by dotted lines the depressed position of the stop means; Fig. 4 is a transverse sectional view of the apparatus shown through 4—4 of Fig. 2; and Fig. 5 is a transverse sectional view through 5—5 of Fig. 2.

Similar characters of reference refer to similar parts and portions throughout the several views of the drawings.

The main floor 1, main platform 2, small operating platform 3, pinion 4, gear rack 5, platform stop member lug 6, spring 7, bolt 8, lug 9, cable 10, weight 11, auto stop member 12, supports 13, connecting bar 14, spring 15, and engaging member 16, constitute the principal parts and portions of my automobile turntable for garages.

The floor 1 is provided with a circular recess 1ª which is provided with a central supporting portion 1ᵇ therein. Mounted in this recess 1ª is the main platform 2 supported on rollers 2ª near its periphery, thus permitting it to freely revolve. The member 1ᵇ is provided with an extended shaft portion 1ᶜ upon which the member 2 is journaled at its center and preferably provided with bearings around and in connection with said journal member. This platform 2 is provided in one side with a circular recess 2ᵈ in which is revolubly mounted a revoluble platform member 3 which is also supported upon rollers 3ª near its periphery. It is provided with a shaft 3ᵇ which extends through a journal in the platform 2 and on the outer end of the shaft 3ᵇ is secured the pinion 4. This pinion 4 meshes with a gear rack 5 which is secured on the member 1ᵇ and extends half-way around the member. Mounted on the lower side of the platform at one side is a lug member 6 in which is shiftably mounted a bolt 8 and provided with a spring 7 interposed between the head of the bolt and the lug 6 to permit the bolt 8 to move inwardly thus providing a resilient stop member. Mounted on the side wall in the opening on the member 1 is a lug 9 which is adapted to engage the head of the bolt 8 when the platform revolves to the proper position for permitting the automobile to move forwardly out of the garage. Mounted in the normally back side of the garage on the platform is an automobile stop member 12 which extends some distance above the platform 2 and is supported on two bell crank members 13 at its opposite ends which are pivotally mounted in a slot in the platform 2, shown best in Fig. 3 of the drawings. Pivotally connected to the lower ends of the bell crank members 13 is a connecting bar 14. One of the bell crank members is provided with a spring 15, the other end of which is secured to the platform, which spring tends to hold the stop member 12 up in the position shown best in Fig. 3 of the drawings. Mounted in the recess 1ª is the stake 16 in the proper position to engage the end of the connecting member 14 when the platform is in the reverse position which moves the stop member 12 down into the slot in the platform out of the way, as shown by dotted lines in Fig. 3, so that the automobile can be driven out over the stop member 12. To the platform on one side is secured a cable 10 which is mounted over downwardly extending lug members 10ª extending downwardly from the platform 2 which are adapted to engage the cable so that the cable is supported near the periphery of the platform 2. The other end of said cable extends up over sheaves 10ᵇ and on the opposite end is provided a weight 11 which is for the purpose of returning the platform 2 to its normal position after the automobile is driven off of the platform 2.

It will be noted that the platform is so balanced that when the weight of the automobile is on the platform it will not move backwardly by the weight 11 as the friction with the load overcomes the weight 11 but as soon as the automobile is driven off of the platform the weight 11 is sufficient to turn the platform back into the proper position to receive the automobile and when the automobile is driven onto the platform the rear traction wheel on the right side continues to turn when the front wheels of the automobile engage the stop member 12 which causes the platform member 3 to revolve which in turn revolves the pinion 4 which meshes with the gear rack 5 causing the platform 2 to revolve a half revolution at which time the stop member consisting of the members 6, 7 and 8 engage the stop member 9 which stops the revolution of the platform and the automobile is then in reverse position ready to be driven out of the garage forwardly.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention what I claim as new and desire to secure by Letters Patent is:

1. In an automobile turntable, a floor with a circular recess therein, a platform revolubly mounted in said recess flush with the floor provided with a recess in one side thereof, a small platform revolubly mounted in said recess in said platform, a pinion in connection with said small platform, a gear rack meshing with said pinion, means for rigidly supporting said gear rack in the recess in said floor.

2. In an automobile turntable, a floor with a recess therein, a platform revolubly mounted in said recess flush with the floor, provided with a recess in one side thereof, a small platform revolubly mounted in said recess in said platform, a pinion in connection with said small platform, a gear rack meshing with said pinion, means for supporting said gear rack in the recess in said floor and stop means in connection with said platform and said floor for stopping said platform in a certain predetermined position in its revolution.

3. In an automobile turntable, a floor with a recess therein, a platform revolubly mounted in said recess flush with the floor, a small platform revolubly mounted in said recess in said platform, provided with a recess in one side thereof, a pinion in connection with said small platform, a gear rack meshing with said pinion, means for supporting said gear rack in the recess in said floor, stop means in connection with said platform and said floor for stopping said platform in a certain predetermined position in its revolution and means for returning said platform to its normal position.

4. In an automobile turntable, a revoluble main platform, a small platform revolubly mounted in one side thereof, a pinion in connection with said small platform and a rigidly mounted gear rack meshing with said pinion.

5. In an automobile turntable, a revoluble main platform, a small platform revolubly mounted in one side thereof, a pinion in connection with said small platform, a rigidly mounted gear rack meshing with said pinion and resilient stop means in connection with said main platform and its support.

6. In an automobile turntable, a revoluble main platform, a small platform revolubly mounted in one side thereof, a pinion in connection with said small platform, a rigidly mounted gear rack meshing with said pinion, resilient stop means in connection with said main platform and its support and cable and weight means connected to one side of said platform tending to turn it in one direction.

7. In an automobile turntable, a revoluble main platform, a small platform revolubly mounted in one side thereof, a pinion in connection with said small platform, a rigidly mounted gear rack meshing with said pinion, resilient stop means in connection with said main platform and its support, cable and weight means connected to one side of said platform, tending to turn it in one direction and stop means in connection with said platform adapted to be engaged by a vehicle for preventing said vehicle from moving on said platform.

8. In an automobile turntable, a revoluble main platform, a small platform revolubly mounted in one side thereof, a pinion in connection with said small platform, a rigidly mounted gear rack meshing with said pinion, resilient stop means between said main platform and its support, cable and weight means connected to one side of said platform, tending to turn it in one direction and stop means in connection with said platform adapted to be engaged by a vehicle for preventing said vehicle from moving on said platform and means for depressing said stop means.

In testimony whereof, I have hereunto set my hand at Orange, California, this 20th day of October, 1924.

HENRY F. BECHER.